United States Patent
Cotton et al.

(10) Patent No.: US 10,088,582 B2
(45) Date of Patent: Oct. 2, 2018

(54) SYSTEM AND METHOD FOR GENERATING SIMULTANEOUS PLURAL FREQUENCIES IN SEISMIC EXPLORATION

(71) Applicant: CGG SERVICES SA, Massy (FR)

(72) Inventors: Julien Cotton, Paris (FR); Cécile Berron, Massy (FR)

(73) Assignee: CGG SERVICES SAS, Massy (FR)

( * ) Notice: Subject to any disclaimer, the term of this patent is extended or adjusted under 35 U.S.C. 154(b) by 122 days.

(21) Appl. No.: 15/115,369

(22) PCT Filed: Feb. 4, 2015

(86) PCT No.: PCT/IB2015/000262
§ 371 (c)(1),
(2) Date: Jul. 29, 2016

(87) PCT Pub. No.: WO2015/118410
PCT Pub. Date: Aug. 13, 2015

(65) Prior Publication Data
US 2017/0168173 A1 Jun. 15, 2017

Related U.S. Application Data

(60) Provisional application No. 61/937,628, filed on Feb. 10, 2014.

(51) Int. Cl.
*G01V 1/02* (2006.01)
*G01V 1/00* (2006.01)

(52) U.S. Cl.
CPC .................................. *G01V 1/005* (2013.01)

(58) Field of Classification Search
CPC ....................................................... G01V 1/005
(Continued)

(56) References Cited

U.S. PATENT DOCUMENTS

| 3,212,473 A | 10/1965 | Bouyoucos |
| 3,263,091 A | 7/1966 | Cole et al. |

(Continued)

FOREIGN PATENT DOCUMENTS

| FR | 1276377 | 10/1961 |
| GB | 921692 | 3/1963 |

(Continued)

OTHER PUBLICATIONS

International Search Report in related International Application No. PCT/IB2015/000262, dated Sep. 23, 2015.
(Continued)

*Primary Examiner* — Ian J Lobo
(74) *Attorney, Agent, or Firm* — Patent Portfolio Builders PLLC

(57) ABSTRACT

A system and method for generating simultaneous plural frequencies in seismic exploration is disclosed. The method includes configuring a seismic source to emit a seismic signal that includes multiple frequencies emitted substantially simultaneously. The method additionally includes identifying a plurality of frequencies to include in the seismic signal and determining an amplitude of the seismic signal. The method further includes obtaining a seismic dataset corresponding to the seismic signal emitted by the seismic source and creating a seismic image of a subsurface of a seismic survey area.

20 Claims, 4 Drawing Sheets

(58) Field of Classification Search
USPC .......................................... 367/32, 49, 189
See application file for complete search history.

(56) References Cited

U.S. PATENT DOCUMENTS

| | | | |
|---|---|---|---|
| 3,268,818 A | | 8/1966 | Cole et al. |
| 3,447,127 A | | 5/1969 | Wiley |
| 3,496,455 A | | 2/1970 | Gouilloud |
| 3,521,162 A | | 7/1970 | Moran et al. |
| 4,167,879 A | * | 9/1979 | Pedersen ............. G01N 29/075 |
| | | | 73/610 |
| 4,286,687 A | * | 9/1981 | Fiske, Jr. .................. G01L 5/14 |
| | | | 181/119 |
| 4,305,274 A | | 12/1981 | Layton |
| 4,431,532 A | | 2/1984 | Wyke |
| 4,598,392 A | | 7/1986 | Pann |
| 4,646,083 A | | 2/1987 | Woods |
| 4,724,532 A | | 2/1988 | Perkins et al. |
| RE32,995 E | | 7/1989 | Fair |
| 4,885,726 A | | 12/1989 | Myers |
| 4,965,522 A | | 10/1990 | Hazen et al. |
| 5,331,604 A | * | 7/1994 | Chang .................... G01V 1/005 |
| | | | 367/31 |
| 5,724,308 A | * | 3/1998 | Sorrells .................... G01V 1/46 |
| | | | 181/103 |
| 6,055,214 A | * | 4/2000 | Wilk ....................... G01S 7/521 |
| | | | 367/99 |
| 2002/0181326 A1 | | 12/2002 | Hornbostel et al. |
| 2011/0011576 A1 | * | 1/2011 | Cavender ................ E21B 33/13 |
| | | | 166/177.1 |
| 2013/0286790 A1 | * | 10/2013 | Eick ......................... G01V 1/02 |
| | | | 367/189 |
| 2015/0138915 A1 | * | 5/2015 | Khan ..................... G01V 1/005 |
| | | | 367/7 |

FOREIGN PATENT DOCUMENTS

| | | |
|---|---|---|
| GB | 979176 | 1/1965 |
| GB | 987083 | 3/1965 |
| GB | 2433780 A | 7/2007 |
| WO | 2006/119179 A2 | 11/2006 |

OTHER PUBLICATIONS

Written Opinion of the International Searching Authority in related International Application No. PCT/IB2015/000262, dated Sep. 23, 2015.

H.J. Rozemond, "Slip-Sweep Acquisition", SEG Expanded Abstracts, 1996, pp. 64-67.

* cited by examiner

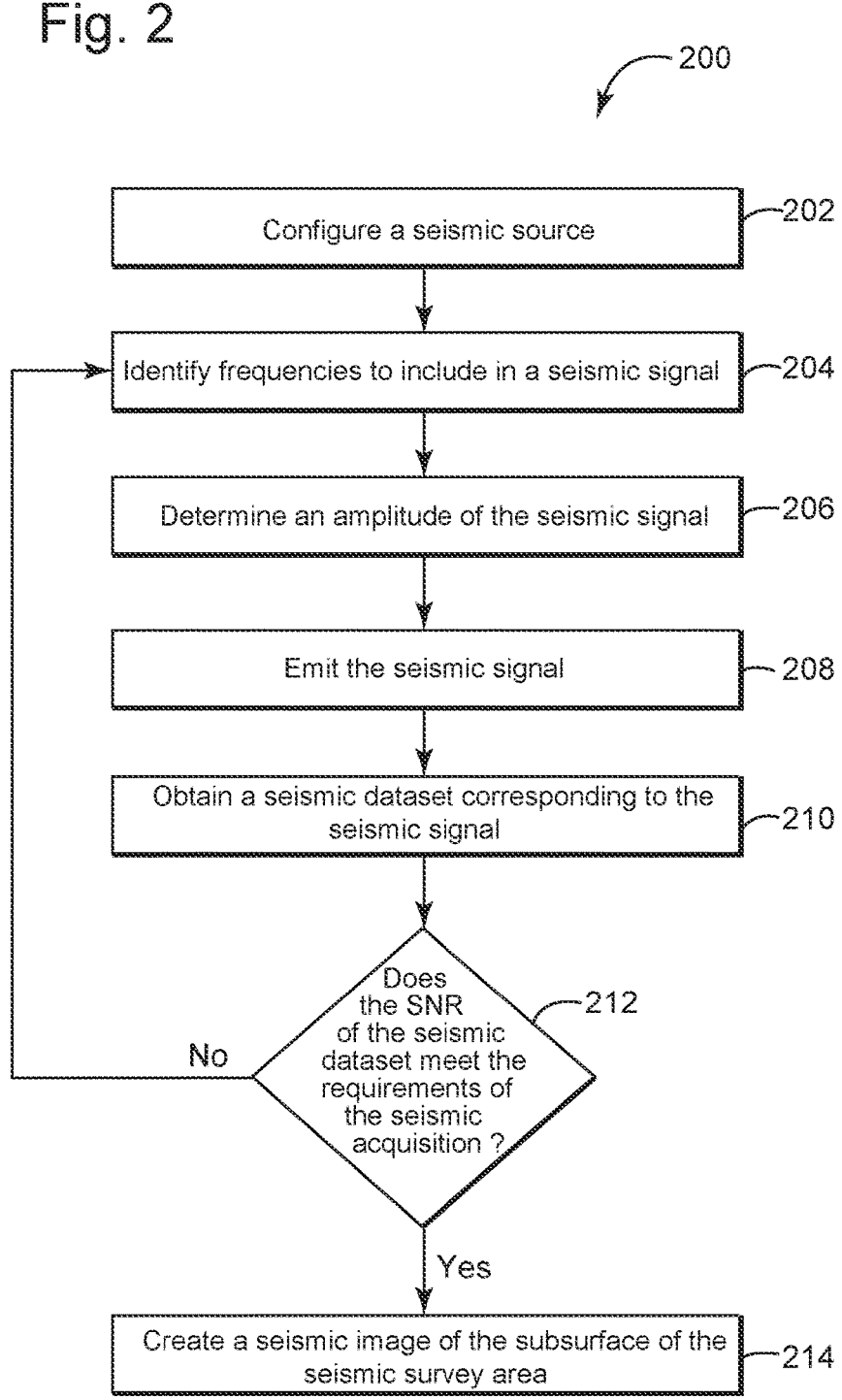

SYSTEM AND METHOD FOR GENERATING SIMULTANEOUS PLURAL FREQUENCIES IN SEISMIC EXPLORATION

CROSS-REFERENCE TO RELATED APPLICATION

This application claims the benefit under 35 U.S.C. § 119(e) of U.S. Provisional Application Ser. No. 61/937,628 filed on Feb. 10, 2014, entitled "Single Seismic Source Generating Simultaneously Plural Frequencies Each Controlled in Phase and Amplitude," which is incorporated by reference in its entirety for all purposes.

TECHNICAL FIELD

The present disclosure relates generally to seismic exploration tools and processes and, more particularly, to systems and methods for generating simultaneous plural frequencies in seismic exploration.

BACKGROUND

In the oil and gas industry, geophysical survey techniques are commonly used to aid in the search for and evaluation of subterranean hydrocarbon or other mineral deposits. Generally, a seismic energy source, or "seismic source," generates a seismic signal that propagates into the earth and is partially reflected by subsurface seismic interfaces between underground formations having different acoustic impedances. The reflections are recorded by seismic detectors, or "receivers," located at or near the surface of the earth, in a body of water, or at known depths in boreholes, and the resulting seismic data can be processed to yield information relating to the location and physical properties of the subsurface formations. Seismic data acquisition and processing generates a profile, or image, of the geophysical structure under the earth's surface. While this profile may not directly show the location for oil and gas reservoirs, those trained in the field can use such profiles to more accurately predict the location of oil and gas, and thus reduce the chance of drilling a non-productive well.

Various sources of seismic energy have been used to impart the seismic waves into the earth. Such sources have included two general types: 1) impulsive energy sources and 2) seismic vibrator sources. The first type of geophysical prospecting utilizes an impulsive energy source, such as dynamite, a mud gun, or a marine air gun, to generate the seismic signal. With an impulsive energy source, a large amount of energy is injected into the earth in a very short period of time. In the second type of geophysical prospecting, a vibrator is used to propagate energy signals over an extended period of time, as opposed to the near instantaneous energy provided by impulsive sources.

The seismic process employing such use of a seismic vibrator, sometimes referred to as "vibroseis," propagates energy signals into the earth over an extended period of time or "sweep." In such instances, energy at a starting frequency is first imparted into the earth, and the vibration frequency changes over the sweep interval at some rate until the stopping frequency is reached at the end of the interval. The difference between the starting and stopping frequencies of the sweep generator is known as the "sweep frequency range," and the amount of time used to sweep through those frequencies is known as the "sweep length." The recorded data may then be correlated with the sweep signal to produce an interpretable record which resembles a conventional seismic record like one from an impulsive source. In land-based implementations, the seismic source signal is generally generated by a servo-controlled hydraulic vibrator, or "shaker unit," mounted on a mobile base unit. In marine implementations, vibrators typically include a bell-shaped housing with a large piston or a diaphragm in its open end. The vibrator is lowered into the water from a marine survey vessel, and the diaphragm is vibrated by a hydraulic drive system similar to that used in a land vibrator.

A seismic signal may be also generated by a SEISMOVIE™ system designed and manufactured by CGG Services SA (Massy, France). A SEISMOVIE™ system may emit energy at individual frequencies, one-by-one, until approximately the entire frequency band is emitted. While a SEISMOVIE™ system does not perform a sweep, a frequency band from the starting frequency to the stopping frequency may still be emitted to create an essentially complete discrete frequency dataset. Except where expressly stated herein, "seismic source" is intended to encompass any seismic source implementation, both impulse and vibratory, including any dry land, transition zone, or marine implementations thereof.

The seismic signal is emitted in the form of a wave that is reflected off interfaces between geological layers. The reflected waves are received by an array of geophones, or receivers, located at or near the earth's surface, which convert the displacement of the ground resulting from the propagation of the waves into an electrical signal recorded by means of recording equipment. The receivers typically receive data during the seismic source's sweep interval and during a subsequent "listening" interval. The receivers record the particle motion or pressure in the medium (for example soil, rock, or water) at their location. The received signals can be processed to estimate the travel time from the seismic source to the receiver. Travel time, in combination with velocity information, can be used to reconstruct the path of the waves to create an image of the subsurface.

A large amount of data may be received by the receivers and the received signals may be recorded and subjected to signal processing before the data is ready for interpretation. The recorded seismic data may be processed to yield information relating to the location of the subsurface reflectors and the physical properties of the subsurface formations. That information is then used to generate an image of the subsurface.

In some implementations, seismic sources may emit frequency sweeps or monofrequencies where many frequencies are emitted one by one over a period of time. The emission of frequencies one by one, either in a frequency sweep or a set of monofrequencies, can be time consuming and can reduce the productivity of the seismic acquisition. While impulsive seismic sources may emit many frequencies simultaneously in a single pulse, the phase and amplitude of the frequencies emitted during the pulse may not be controlled thus resulting in the emission of many frequencies that do not produce useable data. Additionally, in some locations, the use of impulsive seismic sources may be prohibited or subject to permitting requirements or other restrictions. Accordingly, it would be advantageous for a vibratory seismic source to emit multiple frequencies simultaneously while controlling the phase and amplitude of the emitted frequencies.

SUMMARY

In accordance with some embodiments of the present disclosure, a method of seismic exploration is disclosed. The method includes configuring a seismic source to emit a seismic signal that includes multiple frequencies emitted substantially simultaneously. The method additionally includes identifying a plurality of frequencies to include in the seismic signal and determining an amplitude of the seismic signal. The method further includes obtaining a seismic dataset corresponding to the seismic signal emitted by the seismic source and creating a seismic image of a subsurface of a seismic survey area.

In accordance with another embodiment of the present disclosure, a seismic exploration system is disclosed. The system includes a seismic source configured to emit a seismic signal that includes multiple frequencies emitted substantially simultaneously. The system further includes a data processing system that is configured to identify a plurality of frequencies to include in the seismic signal, determine an amplitude of the seismic signal, obtain a seismic dataset corresponding to the seismic signal emitted by the seismic source, and create a seismic image of a subsurface of a seismic survey area.

In accordance with a further embodiment of the present disclosure, a non-transitory computer-readable medium is disclosed. The computer readable-medium includes computer-executable instructions carried on the computer-readable medium. The instructions, when executed, causing a processor to configure a seismic source to emit a seismic signal that includes multiple frequencies emitted substantially simultaneously, identify a plurality of frequencies to include in the seismic signal, determine an amplitude of the seismic signal, obtain a seismic dataset corresponding to the seismic signal emitted by the seismic source, and create a seismic image of a subsurface of a seismic area.

BRIEF DESCRIPTION OF THE DRAWINGS

For a more complete understanding of the present disclosure and its features and advantages, reference is now made to the following description, taken in conjunction with the accompanying drawings, in which like reference numbers indicate like features and wherein:

FIG. 2 illustrates a flow chart of an example method for performing a seismic survey using a seismic source that emits a seismic signal including multiple frequencies in accordance with some embodiments of the present disclosure.

DETAILED DESCRIPTION

Seismic exploration systems use one or more seismic sources to emit a seismic signal. Vibratory seismic sources can emit a seismic signal where energy is emitted at a single frequency one by one, either in a frequency sweep or a set of one or more monofrequencies. The emission of a seismic signal where the energy is emitted at individual frequencies may reduce the efficiency of the seismic acquisition activity. Impulsive seismic sources may be used to emit a single seismic pulse containing multiple frequencies simultaneously, however some seismic exploration areas contain exclusion zones where the use of impulsive seismic source emissions may be restricted or limited. Additionally, the phase and amplitude of the frequencies in single seismic pulse may not be controlled. The seismic data produced from a single seismic pulse may include unusable data because the signal to noise ratio (SNR) may be low. Controlling the phase and amplitude of the seismic signal may allow for processing data from an array of multiple simultaneous seismic sources (e.g., beamforming). Therefore, according to the teachings of the present disclosure, systems and methods are presented that use a single vibratory source to emit a seismic signal that contains multiple frequencies simultaneously. The multiple frequencies are controlled in phase and amplitude. The use of a vibratory source that can emit a seismic signal containing multiple frequencies simultaneously may improve the SNR of the seismic data and improve the seismic acquisition efficiency.

Figure 1C:
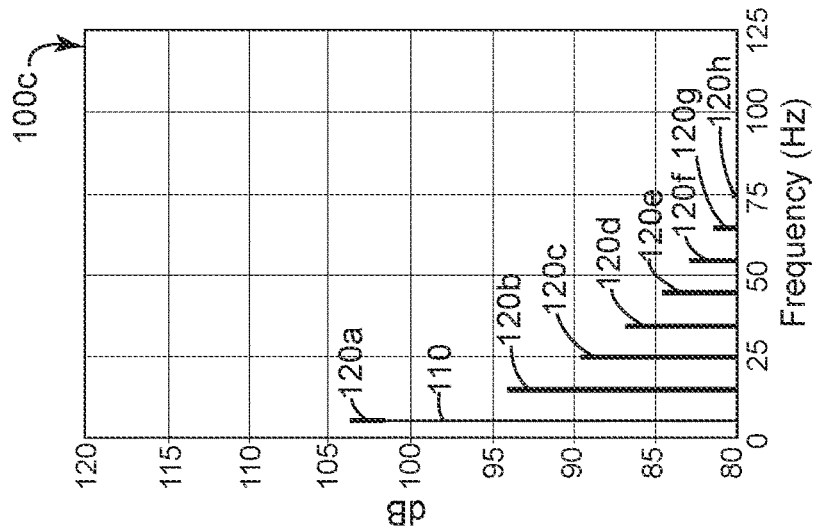
FIG. 1C illustrates a graph of the Fourier transforms of the seismic signals shown in FIGS. 1A and 1B in accordance with some embodiments of the present disclosure.
Figure 1A:
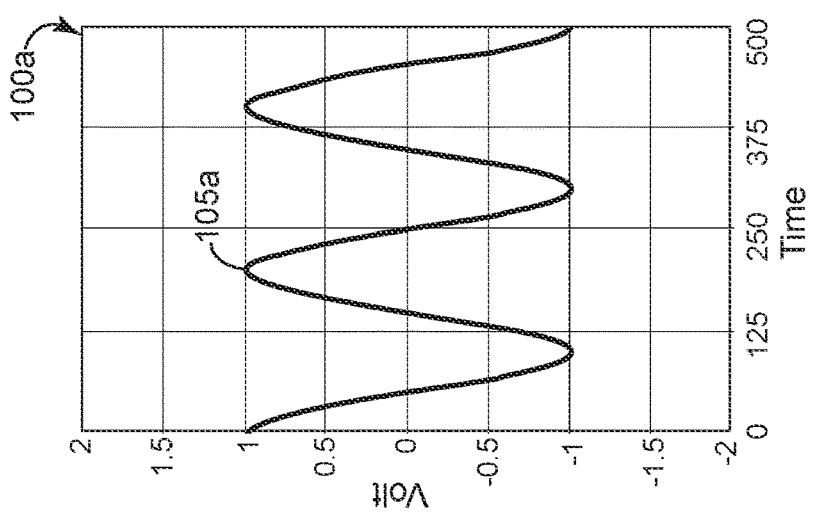
FIG. 1A illustrates a graph of a seismic signal emitted by a seismic source in accordance with some embodiments of the present disclosure.
Figure 1B:
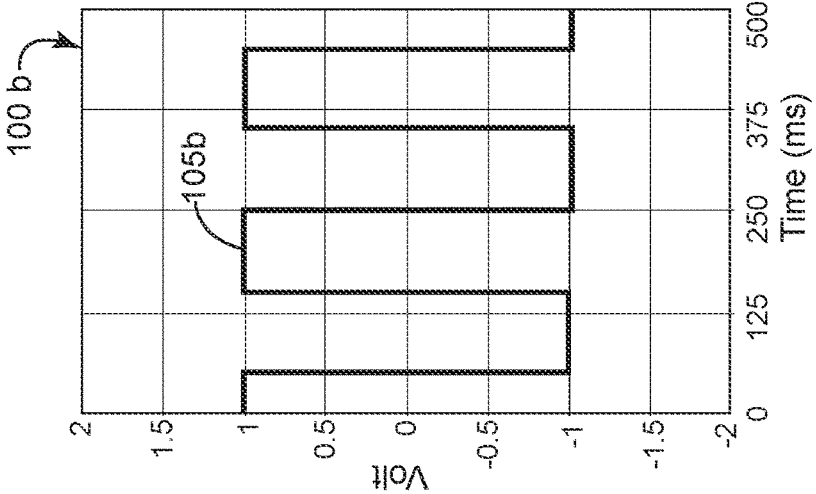
FIG. 1B illustrates a graph of a seismic signal designed to include multiple simultaneous frequencies emitted by a seismic source in accordance with some embodiments of the present disclosure.

FIG. 1A illustrates graph 100a of seismic signal 105a emitted by a seismic source in accordance with some embodiments of the present disclosure. FIG. 1B illustrates graph 100b of seismic signal 105b designed to include multiple simultaneous frequencies emitted by a seismic source in accordance with some embodiments of the present disclosure. Graphs 100a and 100b are example plots of the waveform emission signal as a function of time.

FIG. 1C illustrates bar chart 100c of the Fourier transform of seismic signal 105a and seismic signal 105b, shown in FIGS. 1A and 1B, respectively, in accordance with some embodiments of the present disclosure. Line 110 is the Fourier transform of seismic signal 105a. A Fourier transform may be utilized to transform the amplitude of a signal into frequencies and generate a series of discrete periodic functions. Fourier analysis is the process of decomposing a function of time or space into a sum (or integral) of sinusoidal functions (sines or cosines) with specific amplitudes and phases. A Fourier transform is a set of mathematical formulas used to convert a function, such as a seismic signal, into its frequency-domain representation. As shown by line 110 in FIG. 1C, seismic signal 105a may include a single frequency of approximately five Hertz. Lines 120a-120h represent the Fourier transform of seismic signal 105b. As shown by lines 120a-120h in FIG. 1C, seismic signal 105b may include multiple frequencies including approximately five Hertz and the harmonics of approximately five Hertz, emitted simultaneously. A harmonic of a signal is a frequency of the signal that is an integer multiple of the fundamental frequency of the signal. For example, a harmonic may include energy at a frequency twice or three times that of a fundamental frequency of the seismic signal at a particular time. For seismic signal 105b, approximately five Hertz shown by line 120a, is the fundamental frequency and the frequencies illustrated by lines 120b-120h are harmonics of the fundamental frequency. While in FIGS. 1B and 1C, seismic signal 105b is shown as including eight frequencies, seismic signal 105b may include more or fewer frequencies. In some embodiments, seismic signal 105b may include subharmonics of the fundamental frequency. A subharmonic of a signal is a frequency of the signal that is below the fundamental frequency. The subharmonic is a ratio of 1/n of the fundamental frequency, where n is a positive integer.

Seismic signal 105b may also be emitted at a higher energy level than seismic signal 105a. For example, the approximately five Hertz seismic signal in FIG. 1A may be emitted at approximately 102 decibels while the approximately five Hertz seismic signal in FIG. 1B may be emitted at approximately 104 decibels, as shown in FIG. 1C. Therefore, since seismic signal 105b is emitted at a higher energy, seismic signal 105b may also have an improved SNR when compared to seismic signal 105a. Additionally, since seismic signal 105b includes multiple frequencies (for example, the frequencies of lines 120a-120h), the efficiency of the seismic acquisition may be increased because seismic data based on the multiple frequencies may be obtained substantially simultaneously by the receivers.

In some embodiments, seismic signal 105b may have any suitable shape according to the requirements of the seismic acquisition. For example, seismic signal 105b is shown as a square wave in FIG. 1B. Seismic signal 105b may also be a triangle wave, a sawtooth wave, a periodic wave having an arbitrary shape, or have any other suitable wave shape. The shape of the seismic signal 105b may be determined based on the number of harmonics that meet the design of the seismic acquisition. For example, a square wave may provide higher levels of harmonics than a triangular shaped wave, and a square wave may be selected when the particular seismic acquisition and analysis may benefit from additional harmonic frequencies. Due to system constraints, for example stroke, voltage, or current, it may be important to adjust the relative phase of the various harmonics to produce waveshapes better matched to the equipment to better optimize achievable spectral amplitude levels.

The number of frequencies or harmonics included in seismic signal 105b, along with the phase and amplitude of those frequencies, may be based on many factors. In some embodiments, the type of geology in the earth's subsurface may be used to determine the number of frequencies to include in the seismic signal. For example, seismic signal attenuation may be observed with certain types of geology. Therefore, seismic signal 105b may be designed to emit energy at several frequencies in the frequency ranges where the signal attenuation is observed and may therefore increase the SNR. In other embodiments, the noise level of the environment at the location of the seismic acquisition may be used to determine the frequencies and amplitude of seismic signal 105b. For example, noise may be caused by equipment located in the acquisition area such as generators, machines, electronics, or any other noise generating device. The noise may occur in a specific bandwidth. Seismic signal 105b may be designed to include frequencies with high amplitudes (high energy) in the noisy bandwidths to increase the SNR in the noisy bandwidth region. An increased SNR may cause the resultant seismic data to be more useful for data processing, such as inversion data processing after the seismic data acquisition.

Seismic signal 105b may be emitted by any suitable vibratory seismic source that provides the ability to control the phase and amplitude of the emitted signal, such as hydraulic, pneumatic, electric, magnetorestrictive actuators, or any other suitable vibratory seismic source. In some embodiments, seismic signal 105b may be emitted by a piezoelectric source, an electrodynamic linear motor actuator source, or a magnetorestrictive source. A piezoelectric seismic source may be a source that is powered by electricity. An electrodynamic linear motor actuator source may be a source driven by a moving magnet type actuator. In some embodiments, seismic signal 105a may be designed to control the phase and amplitude of the harmonics of seismic signal 105a. The system and actuator used to emit seismic signal 105a may have nonlinearities and may not behave ideally and thus may have a frequency response that adds a phase shift and/or amplitude droop at different frequencies. Therefore, in some embodiments, harmonics may be added to counteract the harmonics created by the nonlinearities in the vibrator. The output of the seismic source may be monitored, where the output is measured and compared to the designed seismic signal. The phase and amplitude of the harmonics included in the seismic signal may be adjusted to provide a mechanism for achieving the seismic signal as designed.

In some embodiments, seismic signal 105a may be a monofrequency emitted by a SEISMOVIE™ system designed and manufactured by CGG Services SA (Massy, France). A SEISMOVIE™ system may emit energy at individual frequencies (for example, monofrequencies), one-by-one, until approximately the entire frequency band of interest is emitted. After the seismic source emits the frequency band, data processing techniques can reconstruct broad-band information in the time domain to cover the full spectrum covered by the monofrequencies. When each monofrequency signal is emitted, there may be a period of time between each signal where the signal tapers off before the next monofrequency signal begins. The tapering period may be used to limit sharp transitions between frequencies which may cause damage to the vibrating equipment in the seismic source. The tapering period between each signal increases the time and cost of the seismic acquisition. The use of seismic signal 105b may increase the seismic acquisition efficiency due to the ability to emit energy containing multiple frequencies (e.g., the fundamental frequency and the harmonics of the fundamental frequency) simultaneously without a tapering period between each frequency.

After seismic signal 105b is emitted, the seismic data collected may be processed using any suitable data processing technique, such as superposition theory and additive synthesis. The seismic data may be used to produce an image of the earth's subsurface.

FIG. 2 illustrates a flow chart of an example method for performing a seismic survey using a seismic source that emits a seismic signal including multiple frequencies in accordance with some embodiments of the present disclosure. Emitting a seismic signal that includes multiple frequencies simultaneously may increase the SNR of the recorded data, increase the efficiency, and reduce the cost of the seismic acquisition. The steps of method 200 can be performed by an engineer or operator, a user, various computer programs, models, or any combination thereof, configured to deploy, operate, simulate, design, and analyze data from seismic exploration signal systems, equipment, or devices. The programs and models may include instructions stored on a computer-readable medium and operable to perform, when executed, one or more of the steps described above. The computer-readable media can include any system, apparatus, or device configured to store and retrieve programs or instructions such as a hard disk drive, a compact disc, flash memory, or any other suitable device. The programs and models may be configured to direct a processor or other suitable unit to retrieve and execute the instructions from the computer-readable media. Collectively, the engineer, operator, user, or computer programs and models used to deploy, operate, simulate, design, and analyze data from seismic exploration systems may be referred to as a "seismic exploration entity."

In step 202, the seismic exploration entity configures a seismic source. The seismic source may be configured such that the seismic source may emit a seismic signal that includes multiple frequencies that may be emitted simultaneously. For example, the seismic source may be configured to emit seismic signal 105b as described with reference to FIGS. 1B and 1C. The seismic source may be any suitable vibratory seismic source that provides the ability to control the phase and amplitude of the emitted seismic signal, such as hydraulic, pneumatic, electric, or magnetorestrictive actuators; a piezoelectric source; an electrodynamic linear motor actuator source; or a SEISMOVIE™ system. An example of a seismic source may be shown and discussed in further detail in FIGS. 3 and 4. In some embodiments, the seismic exploration entity may configure multiple seismic sources. In such embodiments, the seismic exploration entity may perform steps 204, 206, and 208 for each seismic source.

In step 204, the seismic exploration entity identifies at least two frequencies to include in a seismic signal emitted by the seismic source configured in step 202. The seismic signal may include a fundamental frequency and harmonics of the fundamental frequency. The seismic signal may include any number of harmonics of the fundamental frequency. In some embodiments, the seismic signal may include subharmonics of the fundamental frequency. When the seismic exploration entity identifies the frequencies to include in the seismic signal, the seismic exploration entity may identify a shape of the seismic signal. The shape of the seismic signal may be based on the number of harmonics identified for inclusion in the seismic signal, the relative spectral amplitudes of the identified frequencies, and the phase relationship of the identified frequencies. In some embodiments, the shape of the seismic signal may be based on equipment constraints. For example, a square wave may provide more harmonics than a triangular shaped wave. The shape of the seismic signal may be any suitable shape, such as a square wave, a triangular wave, a sawtooth wave, or a periodic wave having an arbitrary shape. In embodiments where the seismic exploration entity configures more than one seismic source, the seismic exploration entity may create a series or table of frequencies to include in the seismic signal such that none of the seismic sources are emitting the same seismic signal at the same time. In some embodiments, when the seismic source transitions from a first seismic signal including a first frequency set to a second seismic signal including a second frequency set, the seismic source may use a taper function. The taper function may slowly reduce the amplitude of the first seismic signal and then slowly increase the amplitude of the second seismic signal. In other embodiments, the seismic source may switch from the first seismic signal to the second seismic signal without using a taper function.

In some embodiments, the number of frequencies included in the seismic signal may be based on the type of geology in the earth's subsurface. For example, signal attenuation may be observed with certain types of geology. Therefore, the seismic signal may be designed to emit several frequencies in the frequency ranges where the signal attenuation is observed. The emission of multiple frequencies in the signal attenuation range may increase the SNR of the seismic data. In other embodiments, the number of frequencies included in the seismic signal may be based on the noise level of the environment at the location of the seismic acquisition. The noise may be caused by generators, machines, electronics, or any other equipment in the acquisition area and may occur in a specific bandwidth. The seismic signal may be designed to include frequencies in the noisy bandwidths to increase the SNR in the noisy bandwidth region.

In step 206, the seismic exploration entity may determine an amplitude of the seismic signal emitted by the seismic source configured in step 202. The amplitude may be determined to increase the amplitude of the seismic signal at frequencies where the noise is high. For example, the amplitude of the seismic signal may be increased to be higher than the amplitude of the observed noise at the seismic acquisition area. When selecting an amplitude of the seismic signal, the seismic exploration entity may also consider safety, regulatory, environmental, infrastructure, and equipment limitations. Additionally, the seismic exploration entity may adjust the relative phase of the selected frequencies included in the seismic signal. The relative phase may be adjusted to maximize the seismic signal output based on seismic source equipment constraints.

In some embodiments, the seismic source may have nonlinearities and may not behave ideally and therefore may have a frequency response that adds a phase shift and/or amplitude droop at different frequencies. To correct the phase shift or amplitude droop, harmonics may be added to counteract the harmonics created by the nonlinearities in the vibrator. The output of the seismic source may be monitored. For example, the output may be measured and compared to the designed output. The phase and amplitude of the harmonics included in the seismic signal may be adjusted to provide a mechanism for achieving the output as designed.

In step 208, the seismic exploration entity may cause the seismic source to emit a seismic signal. The seismic signal may include the frequencies identified in step 204 and may be emitted at the amplitude determined in step 206. The seismic signal may be emitted by the seismic source configured in step 202.

In step 210, the seismic exploration entity may obtain a seismic dataset corresponding to the seismic signal emitted in step 208. The seismic dataset may be recorded by receivers from reflected or refracted seismic waves emitted by the seismic source in step 208. The seismic dataset may be processed using any suitable data processing technique, such as superposition theory and additive synthesis.

In step 212, the seismic exploration entity may determine whether the SNR of the seismic dataset obtained in step 210 meets the requirements of the seismic acquisition. For example, the seismic acquisition may be used for reservoir inversion processing and require a high SNR to provide usable data at low frequencies. If the SNR of the seismic dataset is too low to provide usable data, method 200 may return to step 204 to change the frequencies included in the seismic signal or the amplitude at which the seismic signal is emitted. If the SNR of the seismic dataset meets the requirements of the seismic acquisition, method 200 may proceed to step 214.

In step 214, the seismic exploration entity may create a seismic image of the earth's subsurface. The seismic image may be based on the data processing techniques described in step 210, such as superposition theory or additive synthesis.

Modifications, additions, or omissions may be made to method 200 without departing from the scope of the present disclosure. The order of the steps may be performed in a different manner than that described and some steps may be performed at the same time. For example, step 204 may be performed before, after, or simultaneously with step 206. Additionally, each individual step may include additional steps without departing from the scope of the present disclosure. Further, more steps may be added or steps may be removed without departing from the scope of the disclosure.

Figure 3:
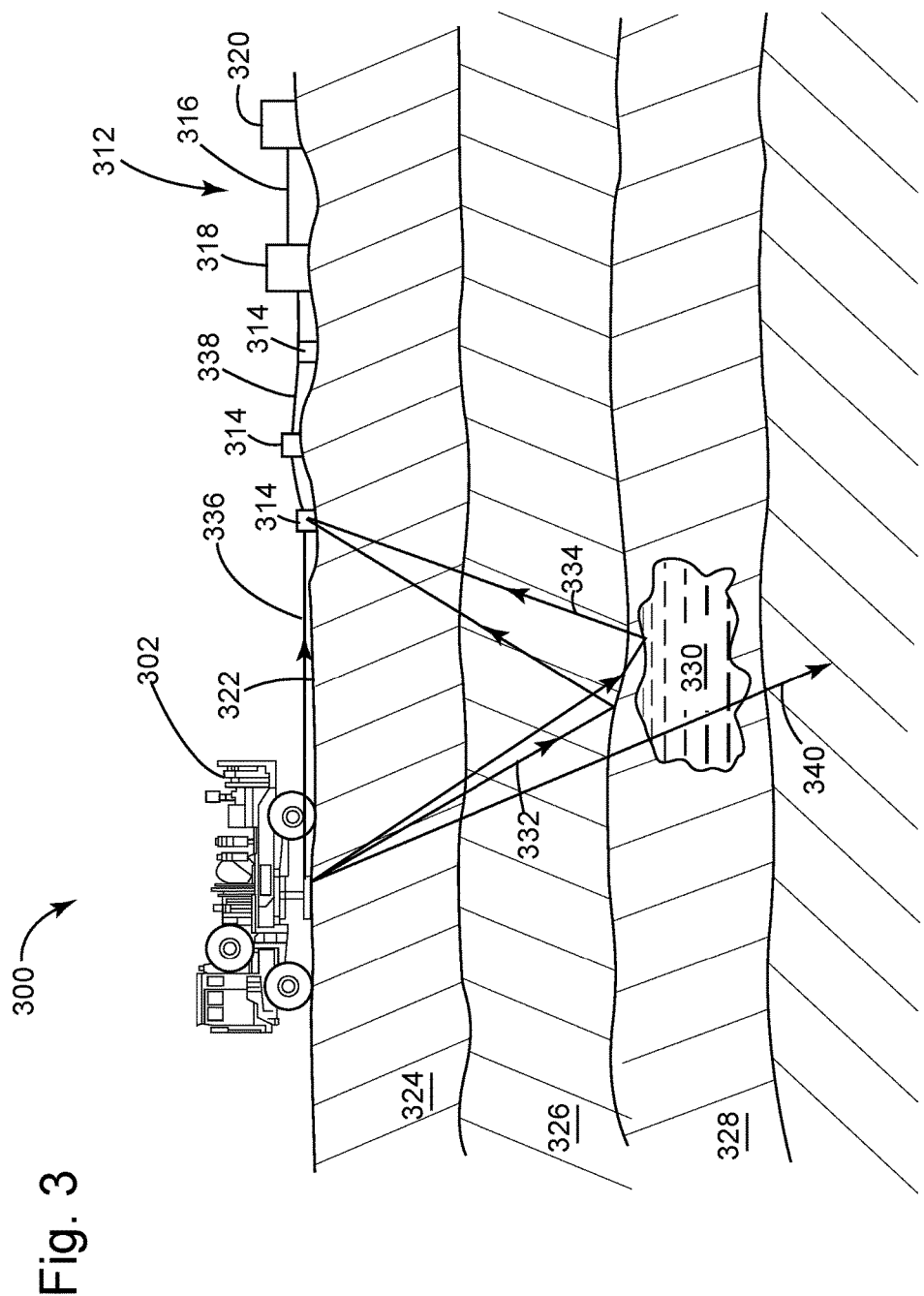
FIGS. 3 and 4 illustrate elevation views of example seismic exploration systems configured to produce images of the earth's subsurface geological structure in accordance with some embodiments of the present disclosure.

The method described with reference to FIG. 2 is used to enhance the effectiveness of a system used to emit seismic signals, receive reflected signals, and process the resulting data to image the earth's subsurface. FIG. 3 illustrates an elevation view of an example seismic exploration system 300 configured to produce images of the earth's subsurface geological structure in accordance with some embodiments of the present disclosure. The images produced by system 300 allow for the evaluation of subsurface geology. System 300 may include one or more seismic energy sources 302 and one or more receivers 314 which are located within a pre-determined exploration area. The exploration area may be any defined area selected for seismic survey or exploration. Survey of the exploration area may include the activation of seismic source 302 that radiates an acoustic wave field that expands downwardly through the layers beneath the earth's surface. The seismic wave field is then partially reflected or refracted from the respective layers as a wave front recorded by receivers 314. For example, seismic source 302 generates seismic waves and receivers 314 record seismic waves 332 and 334 reflected from interfaces between subsurface layers 324, 326, and 328, oil and gas reservoirs, such as target reservoir 330, or other subsurface structures. Subsurface layers 324, 326, and 328 may have various densities, thicknesses, or other characteristics. Target reservoir 330 may be separated from surface 322 by multiple layers 324, 326, and 328. As the embodiment depicted in FIG. 3 is exemplary only, there may be more or fewer layers 324, 326, or 328 or target reservoirs 330. Similarly, there may be more or fewer seismic waves 332 and 334. Additionally, some seismic source waves will not be reflected, as illustrated by seismic wave 340. In addition, in some cases other waves (not expressly shown) may be present that may be useful in imaging a formation or for computing seismic attributes such as refracted waves or mode converted waves.

Seismic energy source 302 may be referred to as an acoustic source, seismic source, energy source, and source 302. In some embodiments, seismic source 302 is located on, buried beneath, or proximate to surface 322 of the earth within an exploration area. A particular seismic source 302 may be spaced apart from other similar seismic sources. Seismic source 302 may be operated by a central controller that coordinates the operation of several seismic sources 302. Further, a positioning system, such as a global positioning system (GPS), may be utilized to locate and time-correlate seismic sources 302 and receivers 314. Multiple seismic sources 302 may be used to improve data collection efficiency, provide greater azimuthal diversity, improve the signal to noise ratio, and improve spatial sampling. The use of multiple seismic sources 302 can also input a stronger seismic signal into the ground than a single, independent seismic source 302. Seismic sources 302 may also have different capabilities and the use of multiple seismic sources 302 may allow for some seismic sources 302 to be used at lower frequencies in the spectrum and other seismic sources 302 at higher frequencies in the spectrum.

Seismic source 302 may comprise any type of seismic device that generates controlled seismic energy used to perform reflection or refraction seismic surveys, such as seismic vibratory sources such as a seismic vibrator, vibroseis, an air gun, a thumper truck, marine vibrators, magnetic vibrators, piezoelectric vibrators, or any source suitable for emitting a controlled seismic signal. In some embodiments, seismic source 302 may be a piezoelectric source, an encoded pulsed source, or other similar system, such as SEISMOVIE™, designed to generate a monofrequency. For example, the seismic signal emitted in step 208 as described in FIG. 2 may be emitted by seismic source 302.

Seismic source 302 may radiate varying frequencies or one or more monofrequencies of seismic energy into surface 322 and subsurface formations during a defined interval of time. Seismic source 302 may impart energy through a sweep of multiple frequencies or at a single monofrequency, or through a combination of at least one sweep and at least one monofrequency or through the use of pseudorandom sweeps. In some embodiments, seismic source 302 may be part of an array of seismic sources and may emit a series of frequencies such that no source in the array emits the same signal at the same time. A seismic signal may be discontinuous so that seismic source 302 does not generate particular frequencies between the starting and stopping frequency and receivers 314 do not receive or report data at the particular frequencies.

Seismic exploration system 300 may include monitoring equipment 312 that operates to record reflected energy seismic waves 332, 334, and 336. Monitoring equipment 312 may include one or more receivers 314, network 316, recording unit 318, and processing unit 320. In some embodiments, monitoring equipment 312 may be located remotely from seismic source 302.

Receiver 314 may be located on, buried beneath, or proximate to surface 322 of the earth within an exploration area. Receiver 314 may be any type of instrument that is operable to transform seismic energy or vibrations into a signal compatible with the data acquisition system, for example a voltage signal, a current signal, or an optical signal. For example, receiver 314 may be a vertical, horizontal, or multicomponent geophone, accelerometers, or optical fiber or distributed acoustic sensor (DAS) with wire or wireless data transmission, such as a three component (3C) geophone, a 3C accelerometer, hydrophone, or a 3C Digital Sensor Unit (DSU). Multiple receivers 314 may be utilized within an exploration area to provide data related to multiple locations and distances from seismic sources 302. Receivers 314 may be positioned in multiple configurations, such as linear, grid, array, or any other suitable configuration. In some embodiments, receivers 314 may be positioned along one or more strings 338. Each receiver 314 is typically spaced apart from adjacent receivers 314 in the string 338. Spacing between receivers 314 in string 338 may be approximately the same preselected distance, or span, or the spacing may vary depending on a particular application, exploration area topology, or any other suitable parameter.

One or more receivers 314 transmit raw seismic data from reflected seismic energy via network 316 to recording unit 318. Recording unit 318 transmits raw seismic data to processing unit 320 via network 316. Processing unit 320 performs seismic data processing on the raw seismic data to prepare the data for interpretation. For example, processing unit 320 may perform the data processing techniques described in steps 210 and 214 in FIG. 2. Although discussed separately, recording unit 318 and processing unit 320 may be configured as separate units or as a single unit. Recording unit 318 or processing unit 320 may include any equipment or combination of equipment operable to compute, classify, process, transmit, receive, store, display, record, or utilize any form of information, intelligence, or data. Recording unit 318 may record the reflected seismic waves from the seismic source, as described with respect to step 210 of FIG. 2. For example, recording unit 318 and processing unit 320 may include one or more personal computers, storage devices, servers, or any other suitable device and may vary in size, shape, performance, functionality, and price.

Recording unit 318 and processing unit 320 may include random access memory (RAM), one or more processing resources, such as a central processing unit (CPU) or hardware or software control logic, or other types of volatile or non-volatile memory. Additional components of recording unit 318 and processing unit 320 may include one or more disk drives, one or more network ports for communicating with external devices, one or more input/output (I/O) devices, such as a keyboard, a mouse, or a video display. Recording unit 318 or processing unit 320 may be located in a station truck or any other suitable enclosure.

Network 316 may be configured to communicatively couple one or more components of monitoring equipment 312 with any other component of monitoring equipment 312. For example, network 316 may communicatively couple receivers 314 with recording unit 318 and processing unit 320. Further, network 314 may communicatively couple a particular receiver 314 with other receivers 314. Network 314 may be any type of network that provides communication, such as one or more of a wireless network, a local area network (LAN), or a wide area network (WAN), such as the Internet. For example, network 314 may provide for communication of reflected energy and noise energy from receivers 314 to recording unit 318 and processing unit 320.

The seismic survey conducted using seismic source 302 may be repeated at various time intervals to determine changes in target reservoir 330. The time intervals may be months or years apart. Data may be collected and organized based on offset distances, such as the distance between a particular seismic source 302 and a particular receiver 314 and the amount of time it takes for seismic waves 332 and 334 from a seismic source 302 to reach a particular receiver 314. Data collected during a survey by receivers 314 may be reflected in traces that may be gathered, processed, and utilized to generate a model of the subsurface structure or variations of the structure, for example 4D monitoring.

Figure 4:
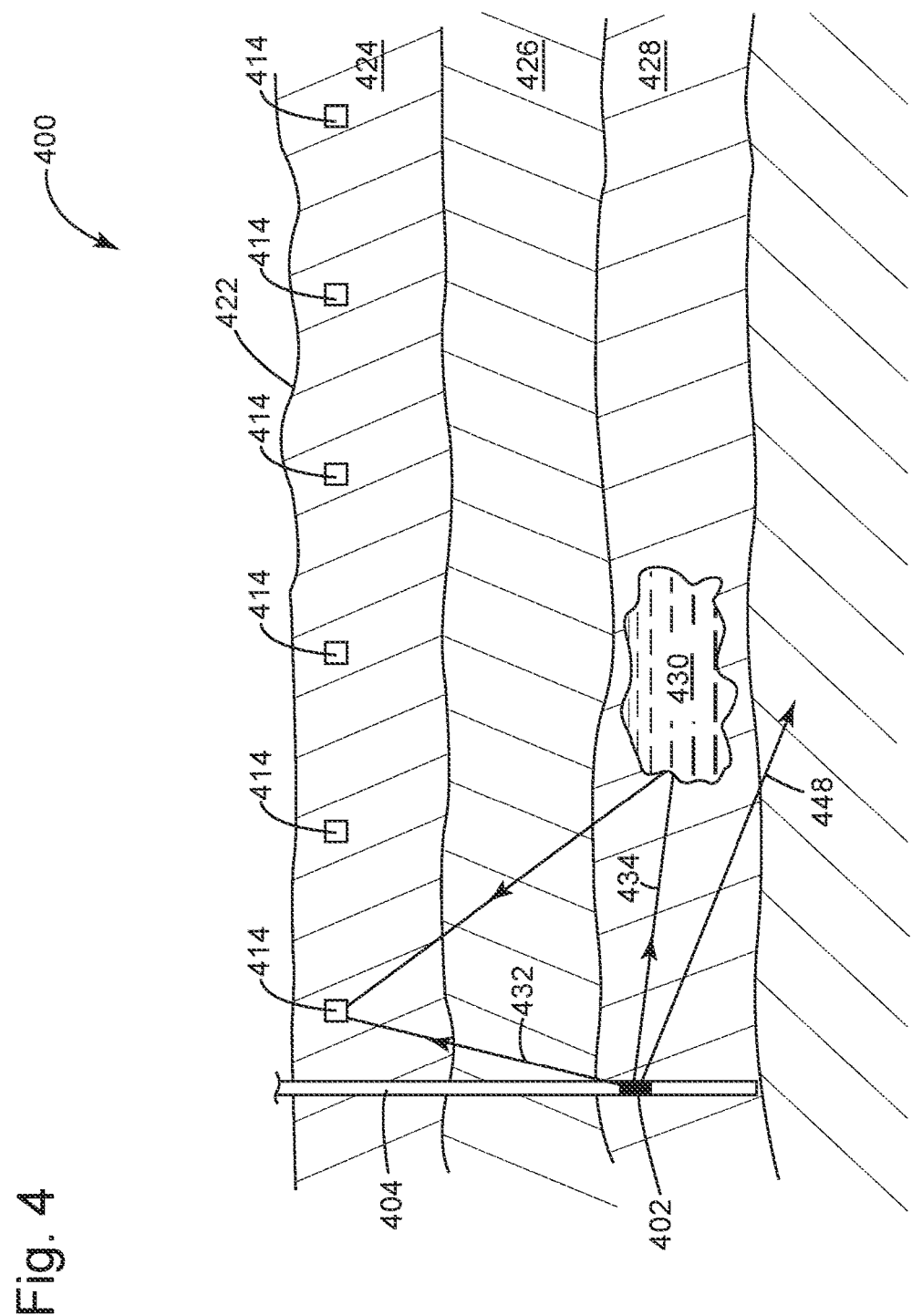

As an example of a second seismic exploration system, FIG. 4 illustrates an elevation view of an example seismic exploration system 400 configured to produce images of the earth's subsurface geological structure in accordance with some embodiments of the present disclosure. Seismic system 400 includes seismic source 402 that may be provided in well 404. Seismic source 402 may be any known seismic source. For example, seismic source 402 may be a SEISMOVIE™ source that may include piezoelectric vibrator elements that provide a wide bandwidth and high reliability/repeatability. Seismic source 402 may radiate an acoustic wave field that expands through the layers beneath the earth's surface. For example, seismic source 402 generates seismic waves and receivers 414 record seismic waves 432 and 434 reflected by interfaces between subsurface layers 424, 426, and 428, oil and gas reservoirs, such as target reservoir 430, or other subsurface structures. As the embodiment depicted in FIG. 4 is exemplary only, there may be more or fewer layers 424, 426, or 428 or target reservoirs 430. Similarly, there may be more or fewer seismic waves 432 and 434. Additionally, some seismic source waves will not be reflected, as illustrated by seismic wave 440. While seismic source 402 is shown in FIG. 4 as being in well 404, seismic source 402 may be installed in surface 422.

One or more receivers 414 may be buried at a predetermined depth relative to the surface of the earth 422 or may be placed on the surface of the earth 422. The predetermined depth may be a distance larger than zero and smaller than the depth of reservoir 430, for example, predetermined depth may be approximately twelve meters. Receiver 414 may be any type of instrument that is operable to transform seismic energy or vibrations into a voltage signal. For example, receiver 414 may be a vertical, horizontal, or multicomponent geophone, accelerometers, or optical fiber or distributed acoustic sensor (DAS) with wire or wireless data transmission, such as a three component (3C) geophone, a 3C accelerometer, hydrophone, or a 3C Digital Sensor Unit (DSU).

In one embodiment, system 400 may include hundreds of receivers 414 and tens of seismic sources 402 configured to continuously emitting seismic waves. Seismic sources 402 may be provided in well 404 (or multiple wells 404) at a depth, for example approximately eighty meters. The data may be generated for over a period of days, weeks, or months. One or more receivers 414 may transmit raw seismic data from reflected seismic energy via a network to a recording unit, as described with reference to FIG. 3. The recording unit may transmit raw seismic data to a processing unit via a network. The processing unit may perform seismic data processing on the raw seismic data to prepare the data for interpretation.

Although discussed with reference to a land implementation, embodiments of the present disclosure are also useful in transition zone and marine applications. In a transition zone application, seismic sources 302 or 402 may be include magnetorestrictive actuators. In a marine application, monitoring equipment 312 or monitoring equipment 412 may include hydrophones or accelerometers contained inside buoyant streamers, which may be towed behind a vessel. Seismic sources 302 or 402 and monitoring equipment 312 or 412 may be towed behind the same or a different vessel or may be suspended from platforms or buoys in the water. Embodiments of the present disclosure may also be used in a seabed acquisition application. In a seabed acquisition application, where receiver 314 or 414 is placed on the seabed, monitoring equipment 312 or 412 may include 3C geophone and hydrophones.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. For example, a receiver does not have to be turned on but may be configured to receive reflected energy.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described. The computer processor may serve as a seismic exploration entity as described in method 200 in FIG. 2.

Embodiments of the present disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer-readable storage medium or any type of media suitable for storing electronic instructions, and coupled to a computer system bus. Furthermore, any computing systems referred to in the specification may include a single processor or may be architectures employing multiple processor designs for increased computing capability. For example, the seismic exploration entity described in method 200 with respect to FIG. 2 may be stored in tangible computer-readable storage media.

Although the present disclosure has been described with several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims. Moreover, while the present disclosure has been described with respect to various embodiments, it is fully expected that the teachings of the present disclosure may be combined in a single embodiment as appropriate. Instead, the scope of the present disclosure is defined by the appended claims.

What is claimed is:

1. A method of seismic exploration, comprising:
configuring a vibratory seismic source to emit a seismic signal that includes multiple frequencies emitted substantially simultaneously;
identifying a plurality of frequencies to include in the seismic signal, wherein the plurality of frequencies includes a fundamental frequency and one or more harmonics of the fundamental frequency;
determining an amplitude of the seismic signal;
selecting a shape of the seismic signal based on a number of the one or more harmonics of the fundamental frequency;
obtaining a seismic dataset corresponding to the seismic signal emitted by the seismic source; and
creating a seismic image of a subsurface of a seismic survey area.

2. The method of claim 1, wherein identifying the plurality of frequencies to include in the seismic signal is based on a type of geology of the subsurface surrounding the seismic survey area.

3. The method of claim 1, wherein identifying the plurality of frequencies to include in the seismic signal is based on a frequency of a noise source in the seismic survey area.

4. The method of claim 1, wherein determining the amplitude of the seismic signal is based on an amplitude of a noise source in the seismic survey area.

5. The method of claim 1, wherein the seismic signal is a square wave.

6. The method of claim 1, wherein the seismic signal is a triangular wave.

7. The method of claim 1, wherein the seismic source includes a plurality of seismic sources.

8. The method of claim 1, wherein determining the amplitude of the seismic signal includes adjusting the relative phase of the plurality of frequencies included in the seismic signal.

9. The method of claim 1, wherein the seismic signal is periodic and has an arbitrary shape.

10. A seismic exploration system, comprising:
a vibratory seismic source configured to emit a seismic signal that includes multiple frequencies emitted substantially simultaneously;
a data processing system configured to:
identify a plurality of frequencies to include in the seismic signal, wherein the plurality of frequencies includes a fundamental frequency and one or more harmonics of the fundamental frequency;
determine an amplitude of the seismic signal;
select a shape of the seismic signal based on a number of the one or more harmonics of the fundamental frequency;
obtain a seismic dataset corresponding to the seismic signal emitted by the seismic source; and
create a seismic image of a subsurface of a seismic survey area.

11. The seismic exploration system of claim 10, wherein identifying the plurality of frequencies to include in the seismic signal is based on a type of geology of the subsurface surrounding the seismic survey area.

12. The seismic exploration system of claim 10, wherein identifying the plurality of frequencies to include in the seismic signal is based on a frequency of a noise source in the seismic survey area.

13. The seismic exploration system of claim 10, wherein determining the amplitude of the seismic signal is based on an amplitude of a noise source in the seismic survey area.

14. The seismic exploration system of claim 10, wherein the seismic signal is at least one of a square wave or a triangular wave.

15. The seismic exploration system of claim 10, wherein the seismic source includes a plurality of seismic sources.

16. A non-transitory computer-readable medium, comprising:
computer-executable instructions carried on the computer-readable medium, the instructions, when executed, causing a processor to:
configure a vibratory seismic source to emit a seismic signal that includes multiple frequencies emitted substantially simultaneously;
identify a plurality of frequencies to include in the seismic signal, wherein the plurality of frequencies includes a fundamental frequency and one or more harmonics of the fundamental frequency;
determine an amplitude of the seismic signal;
select a shape of the seismic signal based on a number of the one or more harmonics of the fundamental frequency;
obtain a seismic dataset corresponding to the seismic signal emitted by the seismic source; and
create a seismic image of a subsurface of a seismic survey area.

17. The non-transitory computer-readable medium of claim 16, wherein identifying the plurality of frequencies to include in the seismic signal is based on a type of geology of the subsurface surrounding the seismic survey area.

18. The non-transitory computer-readable medium of claim 16, wherein identifying the plurality of frequencies to include in the seismic signal is based on a frequency of a noise source in the seismic survey area.

19. The non-transitory computer-readable medium of claim 16, wherein determining the amplitude of the seismic signal is based on an amplitude of a noise source in the seismic survey area.

20. The non-transitory computer-readable medium of claim 16, wherein the seismic signal is at least one of a square wave or a triangular wave.

\* \* \* \* \*